April 25, 1939.  A. CLAUD-MANTLE  2,155,834
BRACKET FOR AUTOMOBILE ROBE RAILS
Filed May 3, 1937
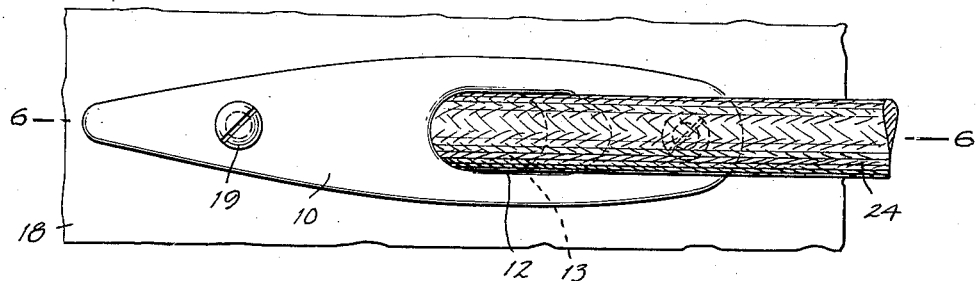
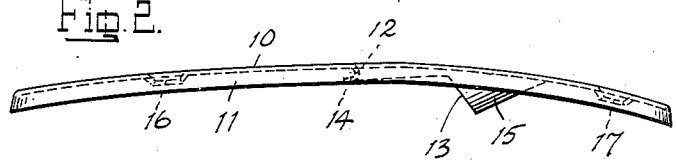
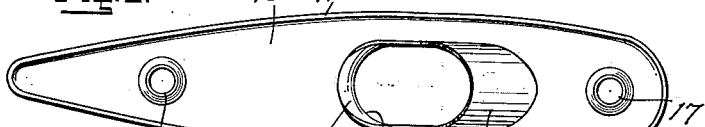
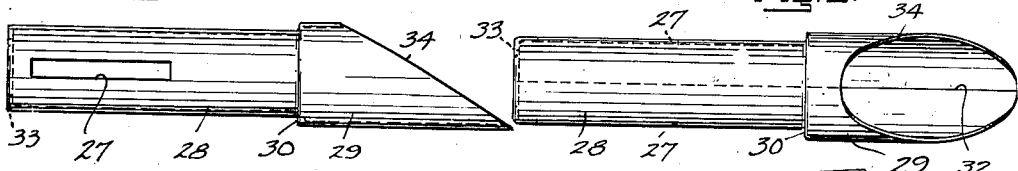 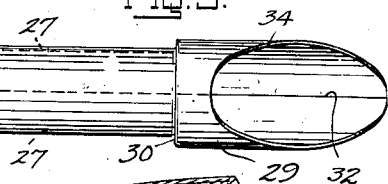
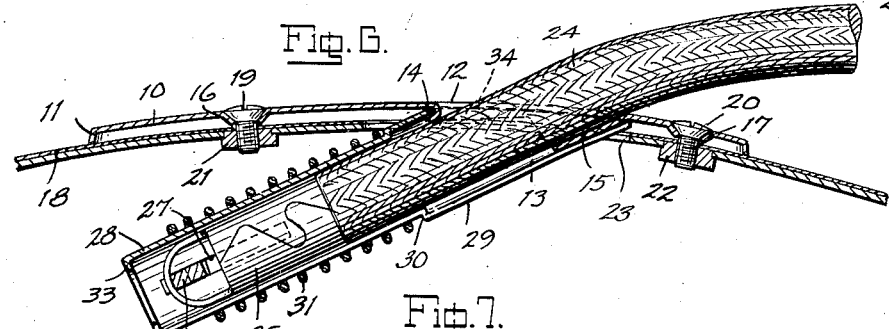
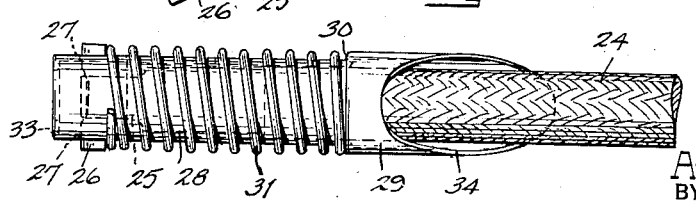
INVENTOR
ARTHUR CLAUD-MANTLE
BY
ATTORNEY Patented Apr. 25, 1939

2,155,834

UNITED STATES PATENT OFFICE 2,155,834

BRACKET FOR AUTOMOBILE ROBE RAIL

Arthur Claud-Mantle, Trumbull, Conn., assignor to The Bassick Company, Bridgeport, Conn., a corporation of Connecticut Application May 3, 1937, Serial No. 140,409

1 Claim. (Cl. 105—354)

The present invention relates to a bracket for automobile robe rail, particularly of the type in which a non-elastic cord is resiliently mounted at its ends, to the end that the cord will at all times remain taut, and when it is desired to support a robe or garments thereon it may be extended to receive the robe or garment and will then retain the same under spring pressure. This type of robe rail bracket is disclosed in my patent for Automobile robe support and bracket therefor, No. 2,031,496, granted February 18, 1936.

It is an object of the present invention to provide a bracket which may be attached to the seat back with facility, and in such manner that the strains imposed upon the bracket by the cord will be transmitted to the bracket and the automobile structure without likelihood of distortion or breakage of the parts.

A further object is to provide a bracket provided inwardly of the automobile structure with means for resiliently connecting the end of the robe rail cord, and further to provide the exposed part of the bracket substantially flush with the automobile structure, so that there will be no projecting parts against which the occupant of the car may be injured, the cord extending out from the bracket in such manner as to provide a cushion over the exposed bracket surface, so that in the event that the occupant of the car is forcibly thrown against the bracket the blow will be cushioned by contact with the cord.

A still further object is to provide attaching means for the cord which may be interlockingly connected with the mounting escutcheon plate of the bracket assembly by the pull exerted by the tensioned cord, thereby greatly simplifying the construction and assembly of the device.

With the above and other objects in view, an embodiment of the invention is shown in the accompanying drawing, and this embodiment will be hereinafter more fully described with reference thereto, and the invention will be finally pointed out in the claim.

In the drawing:

Fig. 1 is a front plan view of a bracket according to the illustrated exemplary embodiment of the invention, and showing the same attached to the seat back and with the end of the robe supporting cord engaged therein.

Fig. 2 is a side elevation of the mounting escutcheon plate of the bracket.

Fig. 3 is a rear plan view thereof.

Fig. 4 is a side elevation of the cord attaching element.

Fig. 5 is a front elevation thereof.

Fig. 6 is a longitudinal sectional view of the bracket and cord assembled with the automobile body structure, being taken along the line 6—6 of Fig. 1.

Fig. 7 is a plan view of the cord attaching element showing the cord in assembled relation therewith.

Similar reference characters indicate corresponding parts throughout the several figures of the drawing.

Referring to the drawing the exemplary illustrated embodiment of the invention shown therein comprises an escutcheon plate member 10 having a rim flange 11 and provided with an opening of substantially oval form diagonally extending through the plate, the upper end 12 of the opening lying in the upper plane of the plate 10 and the lower end 13 of the opening being disposed rearwardly and being connected to the upper end 12 by a flange which at one side is of reduced height and is curled into hook-like form in cross-section, as at 14, to form a retaining means for the cord attaching element, as will presently more fully appear, and at its other end extends in a diagonal direction and is of concave form, as at 15, and forms a supporting surface for the cord at its concave side and a support surface for the cord attaching element at its convex side, as will also presently more fully appear.

Near the ends of the plate 10 there are provided countersunk screw holes 16 and 17. The plate 10 is slightly curved in its longitudinal dimension, so as to conform to the curved surface of the seat back 18, but it will be understood that in the case of a flat seat back the plate will be flat, or that it may be otherwise suitably shaped to conform to the seat back. The plate is secured to the seat back by means of screws 19 and 20, which are engaged with clinch nuts 21 and 22 riveted to the automobile structure in spaced relation to the respective ends of an opening 23 cut into the automobile structure to receive the flanged portions 14 and 15 of the plate and the cord attaching element.

The cord 24 is resiliently connected at its end in a substantially similar manner to the structure disclosed in my U. S. Letters Patent No. 2,031,496, being provided at its end with an eye clip member 25 engaged by a cross bar 26 having its ends projected outwardly through slots 27—27 in a tubular shell 28, which is provided at its inner end with an enlarged diameter portion 29 forming with the portion 28 an annular shoulder 30, between which shoulder and the ends of the cross bar 26 there is engaged a helical spring 31 which normally draws the end of the cord inwardly into the shell, outward pull on the cord being limited by abutment of the cross-pin 26 with the forward ends of the slots 27—27.

The shell may be formed in any suitable manner, but is preferably constructed from flat sheet metal suitably shaped in a die and formed into a tube whereby a longitudinal seam 32 is provided along the base of the shell, the rearward end of the tube being inwardly flanged, as at 33. The portion 29 has its forward end diagonally cut, as at 34, this edge being slightly curved to conform to the curvature of the plate 10. In the assembled relation the edge 34 is engaged about the flange portions 14 and 15 of the plate 10 and through the pull exerted when the cord is tensioned is automatically held in locked relation with these flanges. In this manner the assembly of the cord and the cord attaching member is greatly facilitated. If it is desired to permanently attach the shell to the plate 10, it is only necessary to spot-weld or otherwise secure together the contacting surfaces of the shell portion 29 and the flange portion 15.

It will be understood that a bracket is provided in a similar manner at the other end of the cord, and that the assembly of the two brackets in relation to the cord is such that normally the cord is under tension. It will be also understood that instead of the resilient connection at both ends such connection may be at one end only.

I have illustrated and described a preferred and satisfactory embodiment of the invention, but it will be understood that changes may be made therein, within the spirit and scope thereof, as defined in the appended claim.

Having thus described my invention, what I claim and desire to secure by Letters Patent is:

A bracket for an automobile robe rail, cord or the like for attachment to an automobile body structure or the like, said body structure having a substantially flat surface provided with an opening therein, an escutcheon plate member having an outer surface substantially parallel to said body structure and having an inner surface adapted to be engaged at the outer side of said body structure, and said escutcheon plate member having an apertured portion having a flange which extends diagonally inwardly through said opening in said body structure to receive the robe rail or the like, one end of said flange forming an acute angle with the inner surface of said escutcheon plate member and constituting therewith a hook portion and the other end of said flange forming an obtuse angle with respect to said inner surface, and a tubular member at the inner side of said escutcheon plate member having one end disposed diagonally to its longitudinal axis whereby one side of said tubular members is relatively shorter than its opposed side, said tubular member being engaged about said flange with its diagonally disposed end engaging the inner surface of said escutcheon plate member with the end of its short side engaging said acute angle hook portion of said flange and its opposed long side engaging said obtuse angle portion of the flange, said tubular member adapted to receive the end of the robe rail axially thereof, outward pulling strain on said robe rail axially of said tubular member adapted to draw said long side of said tubular member against said obtuse angle portion of said flange by fulcruming about the end of the opposed short side engaged with said hook portion.

ARTHUR CLAUD-MANTLE.